March 23, 1926.  1,578,122
M. W. HIGGINS
JELLIFYING PRODUCT AND METHOD OF MAKING SAME
Filed Sept. 10, 1925
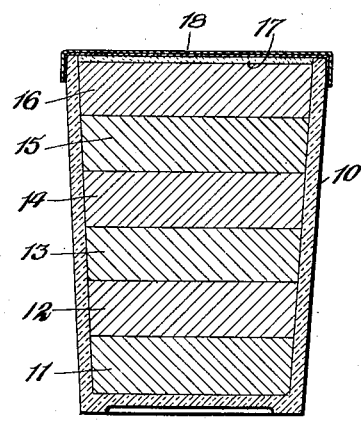
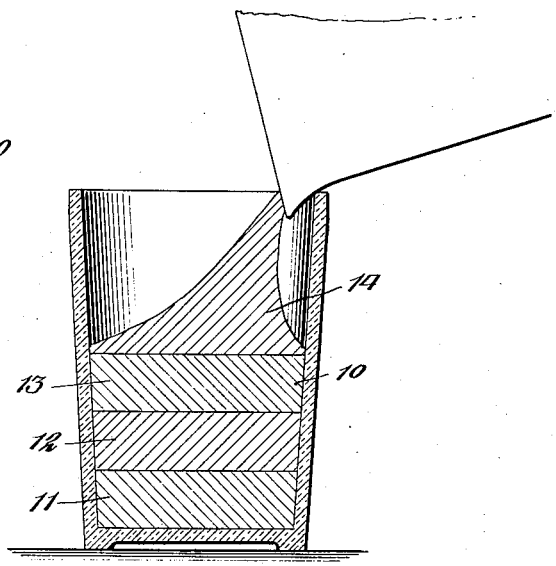
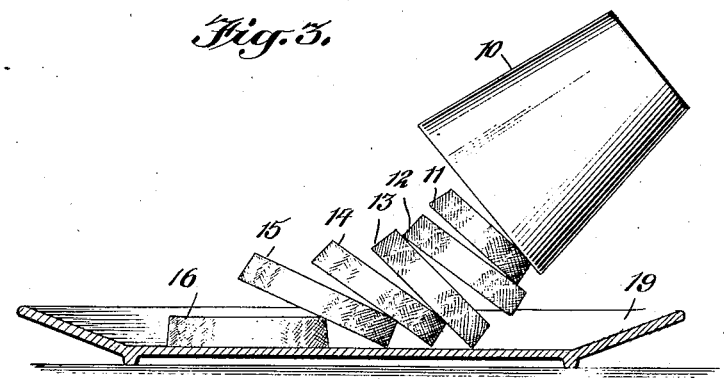
WITNESSES
INVENTOR
Mabel W. Higgins
BY
ATTORNEYS Patented Mar. 23, 1926.

1,578,122

UNITED STATES PATENT OFFICE.

MABEL WATSON HIGGINS, OF SCARSDALE, NEW YORK.

JELLIFYING PRODUCT AND METHOD OF MAKING SAME.

Application filed September 10, 1925. Serial No. 55,569.

*To all whom it may concern:*

Be it known that I, MABEL W. HIGGINS, a citizeness of the United States, and a resident of the town of Scarsdale, in the county of Westchester and the State of New York, have invented a new and Improved Jellifying Product and Method of Making Same, of which the following is a full, clear, and exact description.

This invention relates to a jellifying product and method of making same.

An object of the invention is to provide a simple and efficient method whereby a jellifying product can be poured into a container in such a manner that when the contents are removed therefrom they will in themselves divide into a plurality of separate, individual portions.

A further object of the invention concerns the provision of a jellifying product which is unusually novel and attractive and has commercial possibilities which make it exceedingly unique not only for the purposes of the manufacturer of such products but also for the uses of the housewife.

The invention is illustrated in the drawings of which Figure 1 is a section through a container into which a jellifying product has been poured in accordance with my method.

Figure 2 is a similar view showing the product in the act of being poured into the container;

Figure 3 is a section through a plate on to which the contents of a container are being placed.

In the general aspect of the invention it concerns a method of making jellifying substances so that a container can be filled with such a substance and in such a manner that when the contents of the container are removed from the container they will divide into a plurality of separate portions. This separation and division will take place without the aid of any particular means for dividing the container into compartments and furthermore do not require the use of partitions of any kind. It is especially advantageous for housewives who can thereby provide a separate, individual portions for individual service merely by dumping out the contents of the container whereupon the plurality of separate portions will be immediately available.

Furthermore it is especially advantageous for manufacturers who can furnish the product in this form either for advertising purposes or for actual sale. If a manufacturer desires to furnish a jar of product in each of which is a plurality of layers of different products, my method will enable him to do so, and when the contents are dumped out the various layers will automatically separate.

The process is simplicity itself. Referring to the drawings a container 10 is ready to receive its contents. A portion of the jellifying product, such as 11, is poured into the container and then allowed to completely set. Thereafter a second portion 12, is poured directly on top of the portion 11 and allowed to completely set. Thereafter a third portion is poured directly on top of the succeeding one and allowed to set. In this manner succeeding portions 14, 15 and 16 are poured into the container.

These succeeding portions may be of the same kind of product or they may be of different products.

In the usual manner the top is sealed by a layer of paraffin 17 and the top protected by a cover 18 of any suitable material.

When the contents are dumped from the container 10 on to a dish 19, it is found that they will automatically separate into a plurality of portions ready for individual service without any further manipulation.

It has been found in applying this method that one form of jellifying product which works exceedingly well is a jelly made from fruit, preferably apples, which of course can be colored and flavored as desired.

What I claim is:—

1. A method of making jellifying products which comprises pouring successive layers of such products into a container and allowing each layer to set before succeeding layers are poured in, whereby upon emptying the container the various layers will separate into individual portions.

2. As a new article of manufacture, a container and a plurality of separate independent layers of jelly disposed therein and adapted when poured out of the container to separate into independent portions.

MABEL WATSON HIGGINS.